United States Patent [19]
Montgomery

[11] Patent Number: 5,950,967
[45] Date of Patent: Sep. 14, 1999

[54] ENHANCED DISTRIBUTED POWER

[75] Inventor: Stephen R. Montgomery, Marion, Iowa

[73] Assignee: Westinghouse Air Brake Company, Wilmerding, Pa.

[21] Appl. No.: 08/911,619

[22] Filed: Aug. 15, 1997

[51] Int. Cl.$^6$ .................................................. B61C 17/00
[52] U.S. Cl. .............................. 246/182 R; 246/182 B; 246/122 R; 701/19
[58] Field of Search .......................... 246/167 R, 182 R, 246/182 B, 182 C, 186, 187 R, 122 R; 105/49, 61; 701/19, 20

[56] References Cited

U.S. PATENT DOCUMENTS

| | | | |
|---|---|---|---|
| 4,042,810 | 8/1977 | Mosher | 105/61 |
| 4,234,922 | 11/1980 | Wilde et al. | 246/182 R |
| 4,266,485 | 5/1981 | Bruner et al. | 105/61 |
| 4,401,035 | 8/1983 | Spigarelli et al. | 105/61 |
| 4,602,335 | 7/1986 | Perlmutter | 364/426 |
| 4,618,930 | 10/1986 | Ueno et al. | 246/182 C |
| 4,793,047 | 12/1988 | Curtis et al. | 29/407 |
| 5,364,047 | 11/1994 | Petit et al. | 246/182 R |
| 5,437,422 | 8/1995 | Newman | 246/182 R |
| 5,487,516 | 1/1996 | Murata et al. | 246/182 C |
| 5,564,657 | 10/1996 | Dimsa et al. | 246/187 A |
| 5,570,284 | 10/1996 | Roselli et al. | 364/424.01 |

*Primary Examiner*—Mark T. Le
*Attorney, Agent, or Firm*—Whitham, Curtis & Whitham

[57] ABSTRACT

A train throttle and brake control apparatus is provided for use in a train having a master locomotive and one or more slave locomotives remotely located in the train. In a first embodiment, the apparatus includes a train force calculator which approximates train coupler forces based on computations as a function of the track topography. In a second embodiment, a coupler sensor is provided which senses the forces transmitted by the couplers on the slave locomotives. In either embodiment, a position determining device is included which provides a position signal based on the position of the train. A storage device stores a track database containing track topography information. A controller uses the coupler force computations or measurements, the position information, the track topography information, train consist information, and locomotive control settings to generate slave control signals which are provided to the slave locomotives through a communication device.

21 Claims, 3 Drawing Sheets

ENHANCED DISTRIBUTED POWER

FIELD OF THE INVENTION

The present invention relates to throttle and brake control in trains. More specifically, the present invention relates to a method and apparatus for controlling throttle and brake settings of slave locomotives to reduce coupler forces in the train.

BACKGROUND OF THE INVENTION

A locomotive is a specialized train vehicle which provides immense power in order to move a train. For example, locomotives weighing more than 400,000 pounds and having more 4,500 horsepower are common today. Although locomotives possess such power, it is often desirable in the train industry to transport such a large quantity of goods that the power of a single locomotive is insufficient to move the train effectively. In such cases, multiple locomotives are coupled together in order to combine their power and move the train. Generally a team of locomotives is termed a "consist" with one locomotive being a master locomotive and the other locomotives being slave locomotives.

Traditionally, throttle and brake control of slave locomotives was relatively cumbersome due to almost exclusive use of electromechanical throttle assemblies in locomotives. However, electronic control systems have recently been introduced to the art which advantageously provide two way wireless master-slave communication as disclosed by Roselli et al. in U.S. Pat. No. 5,570,284. The art, however, is still troubled with two problems.

First, without intimate knowledge of the territory, the engineer will have difficulty optimizing throttle and brake settings to anticipate the dynamics of control situations in the territory which lies ahead of the train. Second, although slave control is now easier to perform, due to sheer complexity, engineers are generally provided with limited options for slave throttle and brake control. Generally, an engineer has the option of setting the controls in the master locomotive which setting is then automatically matched by the slave locomotives. Alternatively, the engineer may set the master locomotive control settings and slave locomotive control settings independent from the master locomotive throttle setting. However, it has been generally impractical or undesirable to set slave locomotive control settings independent of other slave locomotive control settings.

SUMMARY OF THE INVENTION

A train throttle and brake control apparatus is provided for use in a train having a master locomotive and one or more slave locomotives remotely located in the train. In a first embodiment, the apparatus includes a train force calculator which approximates train coupler forces based on computations. The computations are a function of track topography and of the consist definition. In a second embodiment, a coupler sensor is provided which senses the forces transmitted by the couplers on the slave locomotives. While some coupler forces are sensed, others can be computed using the sensed coupler forces as inputs. In either embodiment, a position determining device is included which provides a position signal based on the position of the train. A storage device stores a track database containing track topography information. A controller uses the coupler force computations or measurements, the consist definition, the position information and the track topography information to generate slave control signals which are provided to the slave locomotives through a communication device.

DETAILED DESCRIPTION OF THE PREFERRED EMBODIMENTS

The distributed power methods and systems of the present invention are used to minimize coupler forces in long trains, which without the benefit of the present invention, could cause couplers to break if train power were misapplied. While manual distributed power partially improves this problem, it requires special qualifications to operate such a system in undulating territory, where different control settings would be desired for each slave locomotive. Current systems do not allow more than two independent settings on locomotives even though there may be more than one slave locomotive in the train. This is due to the difficulty in manually controlling multiple slave locomotives at different control settings. The present invention uses either sensors or simulation software to compute in-train forces so that they can be managed by independently controlling all slave locomotives in the train. The train forces are monitored and control corrections are made which distribute forces in the train. Further changes required are anticipated based on position and track topology in order to maintain an even distribution of forces in the train.

The computation algorithm provides real-time data on in-train forces. The control algorithm compares actual train performance to anticipated performance for the approaching track characteristics and provides corrections to slave locomotive controls which maintain an even distribution of forces as the track topology changes. The control software takes these corrections and combines them with current control positions. The desired control settings are then provided to the train communications system to be forwarded to the appropriate slave locomotives.

Figure 1:
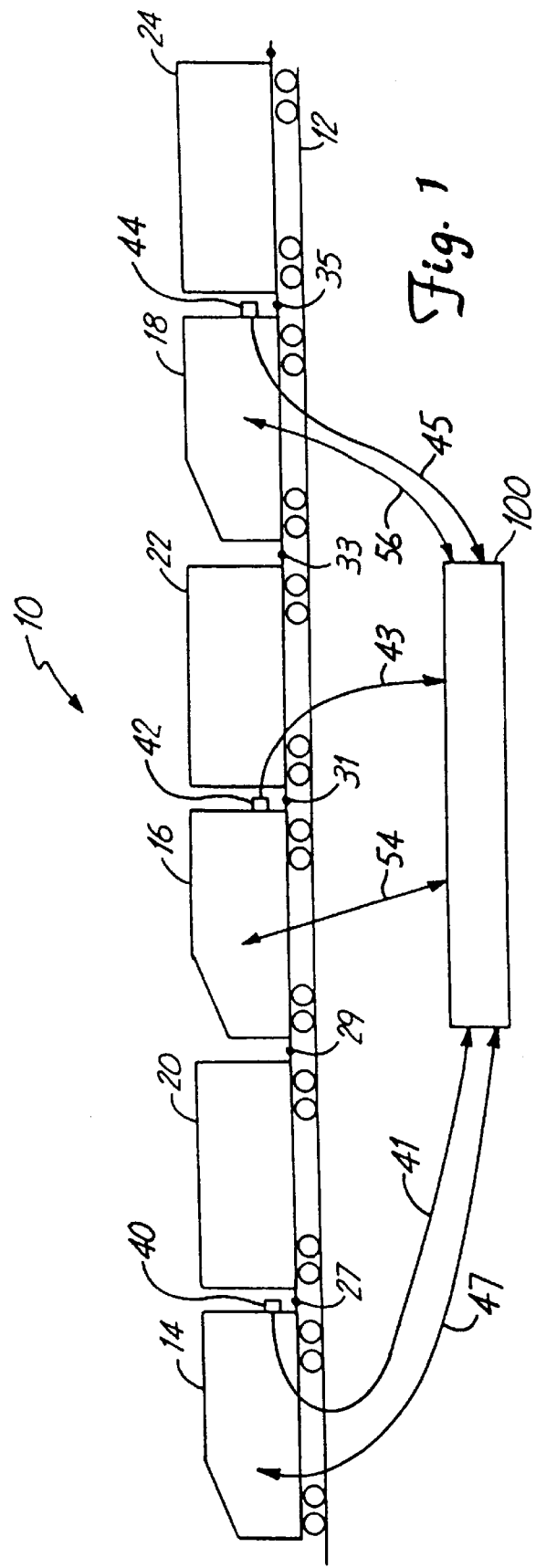
FIG. 1 is a side elevation view of a first train in accordance with the present invention.

FIG. 1 is a side elevation view of train 10 on track 12 in accordance with the present invention. Train 10 includes locomotives 14, 16 and 18 and non-powered cars 20, 22 and 24. All cars (locomotives and non-powered cars) are coupled together in a conventional manner in order to form train 10. Master locomotive 14 is coupled to car 20 through coupler 27. Slave locomotive 16 is coupled to car 20 through coupler 29 and to car 22 through coupler 31. Slave locomotive 18 is coupled to car 22 through coupler 33 and to car 24 through coupler 35. It should be noted that although three locomotives and three non-powered cars are shown in FIG. 1, any appropriate number of locomotives and non-powered cars may be used to form train 10.

In some alternate embodiments, each of master locomotive 14 and slave locomotives 16 and 18 optionally includes one or more coupler force sensors which sense forces transmitted through the corresponding couplers. Thus, locomotive 14 optionally has coupler force sensor 40 disposed thereon which measures forces through coupler 27 and provides sensor signal 41 based thereon. Similarly, locomotive 16 optionally has coupler force sensor 42 disposed thereon which measures coupler forces transmitted through coupler 31 and provides a sensor signal 43 based thereon. Locomotive 18 optionally has coupler force sensor 44 disposed thereon which measures coupler forces transmitted through coupler 35 and provides sensor signal 45 based thereon.

Coupler force sensor signals 41, 43 and 45 are provided to throttle and brake control apparatus 100 which generates slave control signals 54 and 56 provided to the slave locomotives 16 and 18, respectively. Slave control signals 54 and 56 provide commands which set throttle, dynamic brake and air brake functions on slave locomotives 16 and 18, respectively. While signals 47 are illustrated as being transferred between throttle/brake control apparatus 100 and master locomotive 14, it is preferred that throttle/brake control apparatus 100 reside in master locomotive 14.

Figure 2:
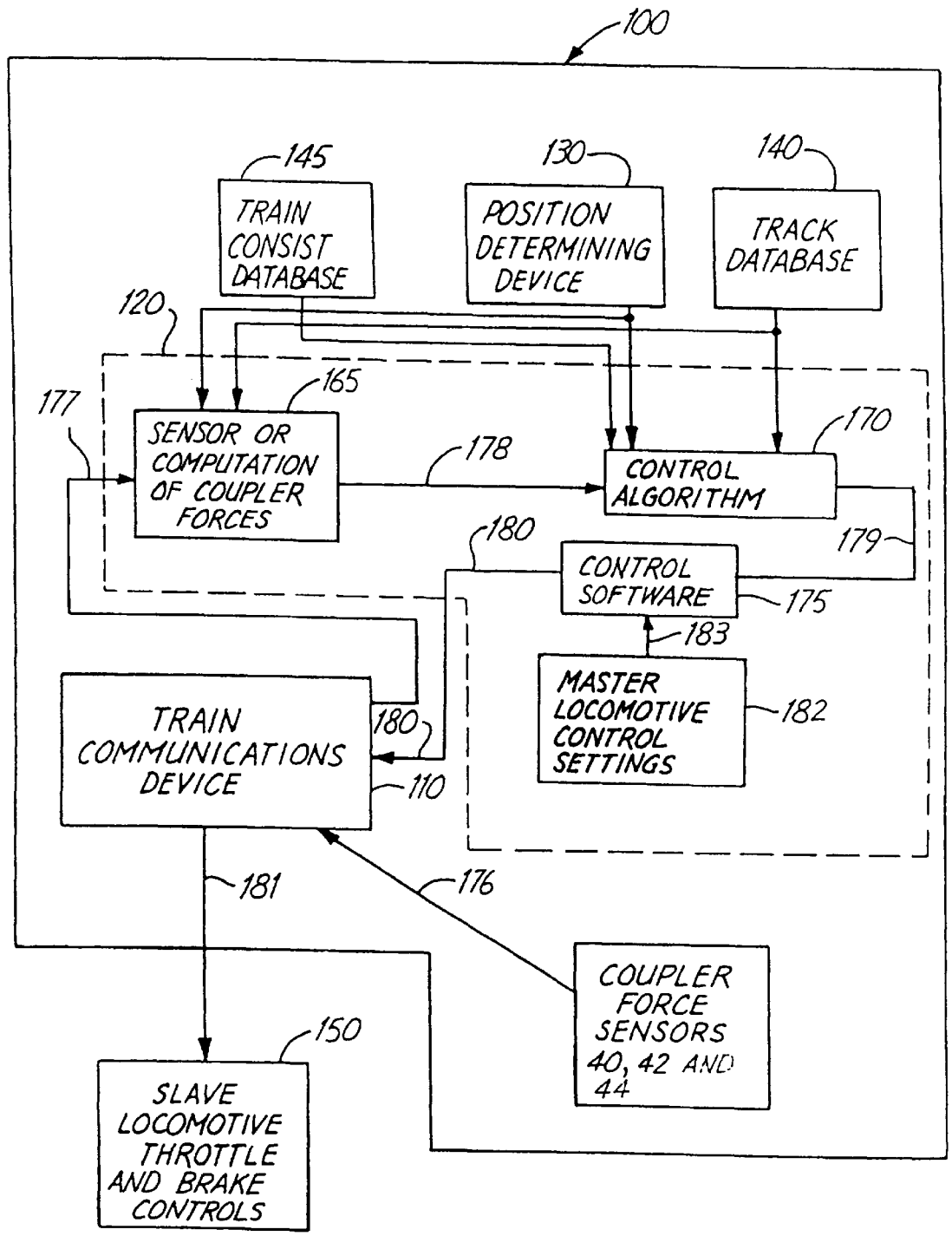
FIG. 2 is a block diagram of a control system using coupler force calculations or measurements, consist definition information, train position information and train topography information to control slave locomotives in accordance with the present invention.

FIG. 2 is a block diagram of a slave locomotive control system in accordance with the present invention. Control system 100 includes train communication device 110, microprocessor or controller 120, position determining device 130, track topography database 140, train consist definition database 145 and slave locomotive throttle/brake controls 150. In alternate embodiments, system 100 optionally includes coupler force sensors 40, 42, and 44. Train communications device 110 provides communication (control signals) from the master locomotive to the slave locomotive throttle and brake controls 150, as indicated by arrow 181, and optionally provides communication from the coupler force sensors to the master locomotive as indicated by arrow 176. Position determining device 130 can be, for example, a GPS receiver based device. Track database 140, which can be stored within the memory of controller 120 or in an associated memory device, contains track topography information for the current and future positions of the train. Train consist information 145 is stored in a similar manner within memory associated with controller 120.

As illustrated, controller 120 performs several functions related to control of the slave locomotive throttle and/or brake settings. As shown at block 175, controller 175 implements the control software which generates control signals to be provided to locomotive controls 150. Control software 175 generates these control signals partially as a function of master locomotive control settings 182 provided to controller 120 as shown at input 183. A control algorithm illustrated at block 170 and train force computations illustrated at block 165 can also be implemented by controller 170 if desired.

At block 165, controller 120 computes or predicts the current train forces using position information from position determining device 130, track topography information from track database 140, consist information from database 145 and current throttle and/or brake control settings from all locomotives. In the alternative, controller 120 can receive measured train coupler forces provided by coupler force sensors 40, 42 and 44. Using coupler forces measured by sensors 40, 42 and 44, coupler forces throughout the train can be more accurately computed. Using the computed or measured train forces, future track topography information, consist information and locomotive control settings, control algorithm 170 provides an output which is used by control software 175 to generate the slave locomotive control signals which best implement the master locomotive control setting while minimizing the forces on the coupler sensors.

Figure 3:
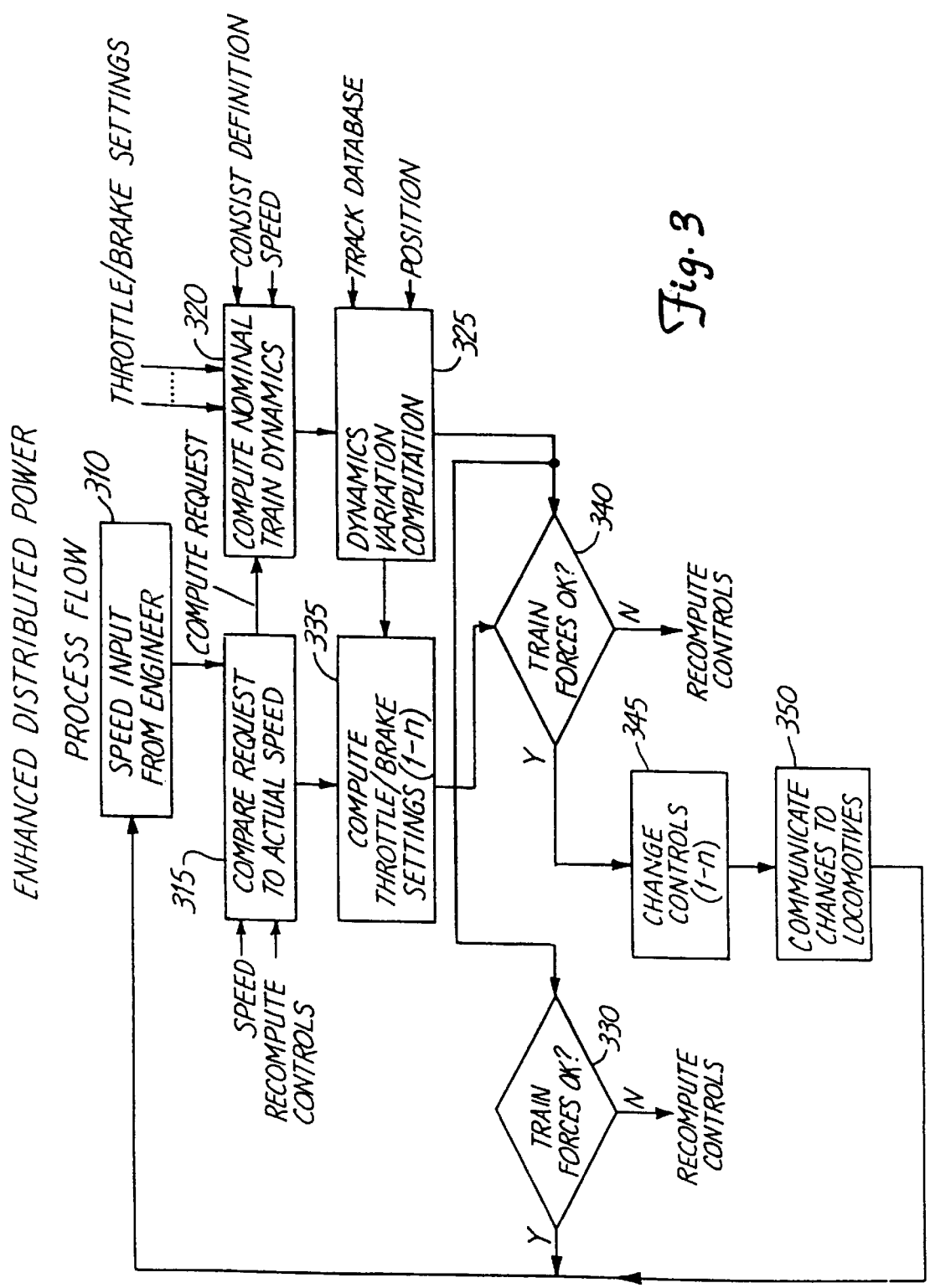
FIG. 3 is a flow diagram illustrating the method in which the control system shown in FIG. 2 controls slave locomotives in accordance with the present invention.

FIG. 3 is a flow diagram illustrating one method in which the control system shown in FIG. 2 can control slave locomotives in accordance with the present invention. As represented in block 310, a desired speed input is provided by the engineer of the train. At block 315, the desired speed is compared to the actual speed of the train. A request is computed based in part upon the difference between the desired speed and the actual speed. At block 320, nominal train dynamic forces are computed as a function of the request, the current throttle/brake settings, the consist definition and the speed. At block 325, variations on the train dynamic forces are computed as a function of current and/or future track topography information using inputs from the position determining device and the track database.

At decision point 330, it is determined whether the train forces are currently acceptable. This determination is based upon the dynamic train force variation computations at block 325. If the train forces are not acceptable, the controls are recomputed and the request process begins again. At block 335, the throttle/brake settings for each of the n slave locomotives are computed as functions of the dynamic variations from block 325, and as functions of the requested speed. At decision 340, if the new throttle/brake settings will not cause unacceptable or non-optimum train forces, the throttle/brake controls are changed (block 345) and communicated to the slave locomotives (block 350). This process can be continuously repeated in order to maintain the train forces at desired levels. If at decision 340 it is determined that the train forces are not acceptable, the controls are recomputed and the request process begins again.

Although the present invention has been described with reference to preferred embodiments, workers skilled in the art will recognize that changes may be made in form and detail without departing from the spirit and scope of the invention. For example, while the present invention is described with reference to two slave locomotives, it is clear that the throttle and brake settings of additional slave locomotives can be controlled in the same manner.

What is claimed is:

1. A train control apparatus for use in a train having a master locomotive and a slave locomotive, the control apparatus comprising:

a position determining device determining a position of the train and providing a position signal based on the train position;

a storage device storing a track database containing track topography information and train consist information;

a controller coupled to the position determining device and the storage device and generating slave control signals as a function of the track topography information associated with the position of the train indicated by the position signal and a position of the slave locomotive in the train based on the consist information, the controller providing the slave control signals to the slave locomotive for use in controlling throttle and brake settings of the slave locomotive; and communication means for providing communication between the controller and the slave locomotive to thereby provide the slave control signals to the slave locomotive for use in controlling throttle and brake settings of the slave locomotive.

2. The train control apparatus of claim 1, wherein the position determining device is a global positioning device.

3. The train control apparatus of claim 1, wherein the position determining device senses a distance traveled by the train and provides the position signal based thereon.

4. The train control apparatus of claim 1, wherein the storage device is disposed within the controller.

5. The train control apparatus of claim 1, wherein the master locomotive and the slave locomotive are separated by at least one non-powered car.

6. The train control apparatus of claim 1, further comprising means for computing simulated coupler forces on couplers of cars in the train, the computed simulated coupler forces being supplied to said controller for generating the independent first and second slave control signals so as to minimize coupler forces.

7. The train control apparatus of claim 1, further comprising a coupler sensor on a slave locomotive coupler for sensing a coupler force and generating a signal to said controller, said controller providing the slave control signals as a functions of the signal from the coupler sensor to control throttle and brakes of a slave locomotive in order to minimize a force coupled by the coupler.

8. The train control apparatus of claim 1, further comprising speed determining means for determining a desired train speed, the slave locomotive control signals being generated as a function of the determined desired train speed while changing an actual train speed to the desired train speed.

9. In a train having a master locomotive and a slave locomotive, a method of controlling throttle and brakes in the slave locomotive comprising the steps of:

determining a train position using a position determining device;

querying a database to determine consist information and to determine a track topography based on the train position;

generating slave locomotive control signals as a function of train consist information and the track topography; and providing the slave locomotive throttle and brake control signals for controlling the throttle and brakes of the slave locomotive.

10. The method of claim 9, further comprising the step of determining a coupler force on couplers in the train, the slave locomotive control signals being generated as a function of the determined coupler force to thereby optimize the force on the couplers.

11. The method of claim 10, wherein the step of determining the coupler force comprises:

providing a coupler sensor signal indicative of the coupler force.

12. The method of claim 10, wherein the step of determining the coupler force comprises simulating the coupler force.

13. The method of claim 9, further comprising the step of determining a desired train speed, the slave locomotive control signals being generated as a function of the determined desired train speed while changing an actual train speed to the desired train speed.

14. A train control apparatus for use in a train having a master locomotive, a first slave locomotive having a first set of throttle and brake controls, and a second slave locomotive having a second set of throttle and brake controls, the train control apparatus comprising:

a position determining device for determining a position of the train and providing position information indicative of the position of the train;

a storage device storing a track database containing track topography information and consist information; and a controller on the master locomotive coupled to the position determining device to receive said position information and accessing said storage device for generating independent first and second slave control signals as functions of the track topography information associated with a determined position of the train and the consist information, the controller providing the first and second slave control signals to the first and second slave locomotives for use in independently controlling the throttle and brakes of the first and second slave locomotives.

15. The train control apparatus of claim 14, wherein the train control apparatus further comprises:

a first coupler sensor sensing a first force coupled by a first coupler on the first slave locomotive and providing a first sensor signal indicative of the first sensed coupler force;

a second coupler sensor sensing a second force coupled by the second coupler on the second slave locomotive, the second coupler sensor providing a second sensor signal indicative of the second sensed coupler force, wherein the controller generates the first and second slave control signals as functions of both of the first coupler force sensed by the first coupler sensor and the second coupler force sensed by the second coupler sensor in order to minimize the forces coupled by the first and second couplers.

16. The train control apparatus of claim 15, wherein the controller provides the first slave control signal to the first slave locomotive for use in controlling throttle and brakes of the first slave locomotive and provides the second slave control signal to the second slave locomotive for use in controlling throttle and brakes of the second slave locomotive to thereby distribute magnitudes of the first and second forces between the first and second couplers.

17. The train control apparatus of claim 14, wherein the controller uses the position information to retrieve from the storage device topography information for future positions of the train, wherein the controller generates the first slave control signal also as a function of the track topography information for future positions of the train.

18. The train control apparatus of claim 14, wherein the position determining device is a global positioning system.

19. The train control apparatus of claim 14 further comprising communications circuitry coupled to the controller, the communications circuitry receiving the first and second slave control signals and providing the first and second slave control signals to the first and second slave locomotives, respectively.

20. The train control apparatus of claim 14, wherein the communication circuitry provides communication between the controller and the first and second slave locomotives.

21. The train control apparatus of claim 14 further comprising means for computing simulated coupler forces on couplers of cars in the train, the computed simulated coupler forces being supplied to said controller for generating the independent first and second slave control signals so as to minimize coupler forces.

* * * * *